United States Patent

[11] 3,607,594

| [72] | Inventor | Raymond Mancel<br>Paris, France |
|---|---|---|
| [21] | Appl. No. | 638,810 |
| [22] | Filed | May 16, 1967 |
| [45] | Patented | Sept. 21, 1971 |
| [73] | Assignee | Societe Anonyme Societe d'Adaptation Industrielles et Commerciales des Mateires Plastiques, SAIMP<br>Paris, France |

[54] PROCESS FOR MAKING A SELF-LUBRICATING MATERIAL AND PRODUCTS OBTAINED THEREBY
11 Claims, 1 Drawing Fig.

[52] U.S. Cl. .................................................. 161/92,
161/95, 161/189, 156/246, 156/309
[51] Int. Cl. ....................................................... B32b 5/00,
F16c 1/00
[50] Field of Search .......................................... 161/88, 89,
92–94, 189, 195; 156/153, 246, 306, 309

[56] References Cited
UNITED STATES PATENTS

| 2,984,599 | 5/1961 | Edwards et al. ............... | 161/189 |
| 2,410,924 | 11/1946 | Blume et al. ................... | 161/94 X |

FOREIGN PATENTS

| 1,482,196 | 4/1967 | France ......................... | 161/94 X |
| 1,404,483 | 5/1965 | France ......................... | 161/94 X |

OTHER REFERENCES

Eley, " Adhesion," 1961 pp. 158– 159, Oxford University Press

Primary Examiner—Robert F. Burnett
Assistant Examiner—Mark A. Litman
Attorney—Bacon & Thomas ABSTRACT: The self-lubricating material comprises a metal fabric completely impregnated with a thermoplastic material bonded to a metal support. The metal fabric and a sheet of the thermoplastic material are assembled on the metal support, the assembly is heated to a temperature sufficient to at least soften the thermoplastic material, after which pressure is applied to the assembly and maintained until after the latter has cooled, the pressure being sufficient to force the metal fabric into intimate contact with the metal support and to cause the thermoplastic material to fill the pores of the metal fabric and to adhere to the metal support.

PATENTED SEP 21 1971                    3,607,594
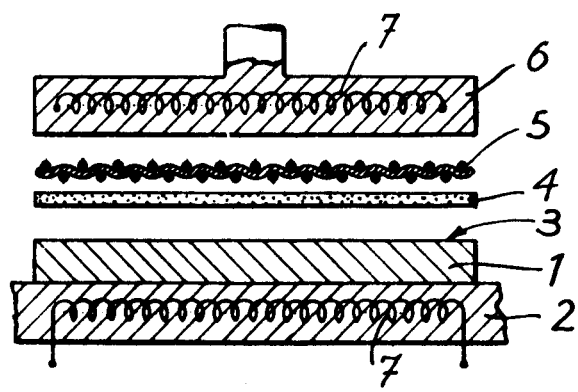
INVENTOR
RAYMOND MANCEL
BY Bacon & Thomas
ATTORNEYS

PROCESS FOR MAKING A SELF-LUBRICATING MATERIAL AND PRODUCTS OBTAINED THEREBY

The present invention relates to a process for making a self-lubricating material, as well as the product obtained by carrying out The process, formed from a metal support, a thermoplastic material and a filling material.

Self-lubricating materials are used more and more in all the industrial fields in which there takes place rubbing between two parts which move one with respect to the other, and which cannot be lubricated by oil or grease.

The use of "Teflon" as a self-lubricating material is already known, and there is already described in French Pat. No. 1,404, 483 of the Apr. 17, 1964, a process for the manufacture of a self-lubricatng material consisting, in a general manner, of placing on a metal support a graphite fabric and a sheet of "Teflon" FEP, and thereafter heating the assembly to a temperature slightly higher than the melting point of the "Teflon" FEP whilst maintaining the assembly under pressure so as to cause the graphite fabric to be entirely impregnated by the "Teflon" FEP and to cause the latter to adhere to the metal support.

The process described in the aforesaid French Pat. No. 1,404,483 also includes features which are particularly concerned, on the one hand, to subject one of the surfaces of the metal support to a sand blasting so as to obtain a surface having micropores, on which surface is deposited a very thin layer of "Teflon" FEP and, on the other hand, to remove by machining a small thickness of the layer of "Teflon" FEP and of the graphite fabric in order to ensure direct contact of the graphite fabric with a movable part. According to the invention, the process of manufacture of a self-lubricating material including a metal support, a sheet of thermoplastic material and a metal fabric filling material is characterized in that one of the surfaces of the metal support is subjected a simple cleaning operation, a very thin metal fabric is placed on this surface of the metal support, a sheet of thermoplastic material is placed between the metal support and the metal fabric and/or on the metal fabric and, after the assembly has been heated to a temperature at least slightly higher than the softening temperature of the thermoplastic materials there is applied to the assembly until it is cool a pressure sufficient to cause the thermoplastic material to fill the pores of the metal fabric and to adhere to the said metal support, the quantity of thermoplastic material being chosen such that all the pores of the metal fabric are completely filled by the thermoplastic material and that the said fabric is covered by an extremely thin layer of the thermoplastic material.

Other characteristics of the present invention will appear from the following description of two embodiments of the process and of the self-lubricating material thus obtained, which description is made with reference to the accompanying drawing in which:

The single FIGURE shows, in diagrammatic section, the different phases of operation of one manner of performing the process.

As will be seen in the single FIGURE, a metal support 1, such as a plate, strip of sheet, is placed on a work table 2 which can be heated. One of the surfaces 3 of the metal support 1 has been previously subjected to a simple cleaning operation so that a good adherence to the metal support will be obtained.

On this surface 3 is disposed directly a sheet 4 of ordinary polytetrafluoroethylene, known as "Teflon" or "Teflon" FEP, and on top of this sheet 4 is placed a metal fabric 5, preferably of bronze or stainless steel.

The thickness of the metal fabric 5 is, for example, of the order of two to five one-hundredths of a millimeter, while the thickness of the sheet of "Teflon" 4 is determined according to the dimensions of the meshes of the fabric 5.

The assembly including the metal support 1, sheet of "Teflon" 4 and metal fabric 5 is placed between the work table 2 and a piston 6, which latter are both provided with heating elements 7, and heated to a temperature at least slightly higher than the softening temperature of the "Teflon."

When the "Teflon" has been heated to this temperature, the assembly 1, 4 and 5 is compressed by means of the piston 6, and the pressure is maintained until after the assembly has cooled.

The temperature and the applied pressure are determined, with a view to forming a homogeneous assembly, as a function of the dimensions of the meshes of the fabric 5, of the thermoplastic material 4 and of the desired duration of the operations.

The "Teflon" at this temperature is in a state which is at least pastelike and under the effect of the applied pressure penetrates the pores of the metal fabric 5 and adheres to the cleaned surface of the support 3. Moreover, the total quantity of "Teflon" used is determined in such a way that during the compression operation, the "Teflon" completely fills the pores of the metal fabric 5 without preventing the latter from coming intimate contact with the surface 3 of the metal support 1. Any possible excess of "Teflon" would be able to escape from the lateral edges of this support 1. As the "Teflon" penetrates the pores of the fabric 5, the air previously contained therein is forced out upwardly.

Finally, after cooling under pressure of this assembly 1, 4 and 5, the self-lubricating material thus obtained is removed from the work table and immediately usable without any other finishing operation being necessary.

There exists, at the surface of this material, an extremely thin film of "Teflon" which, during use of the material is constantly replaced by the "Teflon" contained in the pores of the metal fabric 5.

In such a self-lubricating material, the principal role of the "Teflon" is that of a lubricant, and also for fixing the metal fabric onto the support, will the principal role of the metal fabric 5 is to dissipate into the metal support the heat produced by friction and to transmit the loads of a movable part on to the said support when the material is used to form a bearing for example. It is advantageous to use a metal fabric in which the diameter of the threads is in a ratio of 1 to 4 with the distance between two adjacent thread-intersections of the fabric.

From this material there can be obtained bearings capable of supporting a load of 400 kg./cm.$^2$ with a peripheral speed of a rotatable shaft of the order of 3 m./sec. without undergoing any detectable deformation and without undue heating. There has also be obtained a swivel joint which was subjected to static loads of 30 tons/cm.$^2$ without destruction or deformation of the metal fabric-"Teflon" complex, the metal of the support, by contrast, having flowed.

Of course, the process is not limited to the use of "Teflon." Other thermoplastic materials are suitable, e.g., polyethylene.

Instead of making the self-lubricating materials from a plate, strip or sheet, it is possible to treat directly, by using a suitable apparatus, the support of a part subjected to rubbing such as a bearing.

It can also be advantageous to perform the operations of heating and compression in a vessel in which preferably prevails a suitable vacuum.

The present invention has the particular advantage of requiring neither a prior sand blasting operation to provide the micro pores at the surface of the metal support, nor complementary finishing operations such as superficial machining of the finished part.

It is not important, during the course of manufacturing the self-lubricating materials, whether the sheet of thermoplastic material is introduced between the metal support and the metal fabric or whether the metal fabric is introduced between the metal support and the sheet of thermoplastic material. It is also possible to provide two sheets of thermoplastic material, one at either side of the metal fabric, the thickness of the sheet being naturally determined so that the quantity of thermoplastic material is sufficient to fill completely all the pores of the metal fabric and to constitute an extremely thin layer at the surface of the latter.

I claim:

1. A process for making a self-lubricating material from a metal support, a sheet of thermoplastic material, and a filling material comprising subjecting one of the surfaces of the metal support to a simple cleaning operation, and thereafter assembling on this surface of the support a very thin metal fabric and a sheet of thermoplastic material said sheet being placed between the support and the metal fabric or on the metal fabric, heating the assembly to a temperature at least slightly higher than the softening temperature of the thermoplastic material, and then applying to the assembly, and maintained until after the latter has cooled, a pressure sufficient to force the metal fabric into intimate contact with the support and to cause the thermoplastic material to fill the pores of the metal fabric and to adhere to the support, the quantity of thermoplastic material being chosen so that all the pores of the metal fabric are completely filled by the thermoplastic material and the exposed surface of the fabric is covered by a very thin layer of the thermoplastic material.

2. A process according to claim 1 characterized in that the heating and the pressing of the assembly are affected in a vessel under vacuum.

3. A SELF-lubricating material comprising a metal support, a filling material and a thermoplastic material, characterized in that the filling material is a metal fabric in direct contact with the metal support and covered on its outer face by a very thin film of thermoplastic material which completely fills all the pores of the fabric.

4. A material according to claim 3 wherein the metal fabric is of bronze.

5. A material according to claim 3 wherein the metal fabric is of stainless steel.

6. A material according to claim 3 wherein the thermoplastic material polytetrafluoroethylene.

7. A material according to claim 3 wherein the thermoplastic material is of polyethylene.

8. A material according to claim 3 wherein the diameter of the threads of the metal fabric lies between two one-hundredths and several tenths of a millimeter.

9. A material according to claim 3 wherein the ratio between the diameter of the threads of the metal fabric and the distance between two adjacent points of intersection of the fabric is of the order of 1 to 4.

10. The material of claim 3 wherein the metal support is constituted by that portion of the device intended to be subjected to the load of a member movable thereon.

11. The material according to claim 3 wherein the thickness of the metal fabric is between two and five one-hundredths of a millimeter.